Oct. 5, 1954 — R. O. PETERSON — 2,690,631
ROTARY ABRADING TOOL
Filed June 25, 1952 — 2 Sheets-Sheet 1
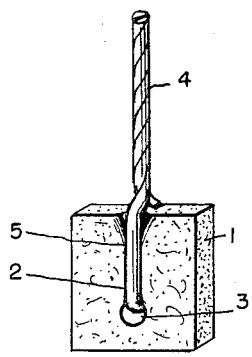
Fig. 1
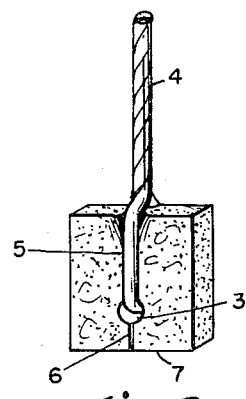
Fig. 2
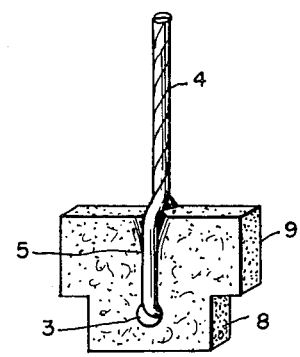
Fig. 3
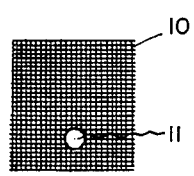
Fig. 4
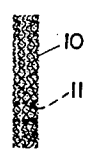
Fig. 5
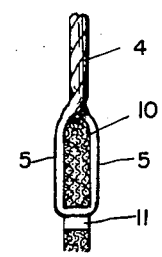
Fig. 6
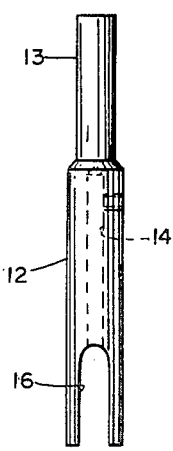
Fig. 7
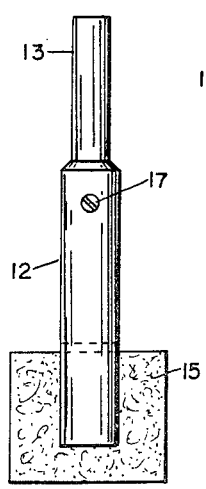
Fig. 8
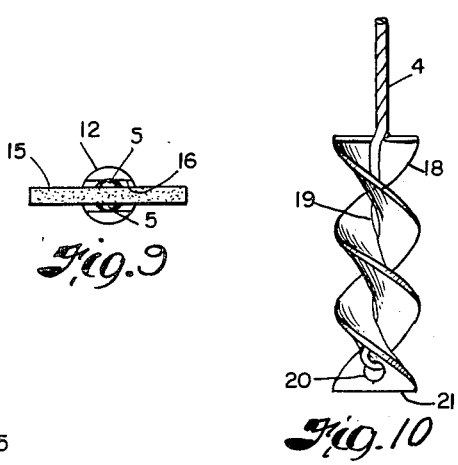
Fig. 9
Fig. 10
INVENTOR.
RUBEN O. PETERSON
BY
Oberlin & Limbach
ATTORNEYS.

Oct. 5, 1954  R. O. PETERSON  2,690,631
ROTARY ABRADING TOOL
Filed June 25, 1952  2 Sheets-Sheet 2

INVENTOR.
RUBEN O. PETERSON
BY
Oberlin & Limbach
ATTORNEYS.

Patented Oct. 5, 1954

2,690,631

UNITED STATES PATENT OFFICE 2,690,631

ROTARY ABRADING TOOL

Ruben O. Peterson, University Heights, Ohio, assignor to The Osborn Manufacturing Company, Cleveland, Ohio, a corporation of Ohio Application June 25, 1952, Serial No. 295,406

7 Claims. (Cl. 51—186)

This invention relates as indicated to a novel rotary surface-finishing tool, and more particularly to a tool especially adapted to clean, polish, etc., the interior surfaces of blind holes and the like. This application is a continuation-in-part of my co-pending application Serial No. 90,585, filed April 30, 1949, now Patent No. 2,603,921, dated July 22, 1952.

Certain subject-matter disclosed but not claimed herein is disclosed and claimed in my co-pending application Serial No. 424,010, filed April 19, 1954.

Various types of rotary brushes have been employed in the past for the purpose of cleaning and surface-finishing tubular articles such as boiler tubes and the like but no such tool has been available which would simultaneously similarly clean or finish the end of a blind opening. The ordinary type of twisted wire stem brush is, of course, unable to perform any such function since the brush material therein extends only laterally and, in fact, care must ordinarily be taken to see that the end of the brush does not actually contact the blind end of the opening since otherwise the stem portion thereof may actually mar the work, and the brush material may become distorted. For this reason, it is usually impossible as a practical matter even to brush the lateral surfaces of the hole closely adjacent the inner end thereof.

It is therefore a primary object of my invention to provide a novel rotary tool adapted to clean, polish and surface condition not only the lateral surfaces of an opening in a work-piece but also simultaneously a blind end of such opening.

It is a further object of this invention to provide such tool which will be very inexpensive of manufacture and which is readily adapted for use with such standard rotary driving means as drill presses, hand drills, and the like.

Still another object of my invention is to provide a tool of the type indicated in which the surface-finishing material is firmly held and which will therefore have a relatively long life.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a perspective view of one typical embodiment of my new rotary tool;

Fig. 2 is a form of such tool modified for ease of manufacture;

Fig. 3 is a similar form of tool contoured to operate within a stepped opening;

Fig. 4 is a brushing element adapted to be employed in my new tool and comprising a plurality of layers of screen material secured together;

Fig. 5 is an edgewise view of such element;

Fig. 6 shows a tool including such element, the latter being sectioned centrally thereof;

Fig. 7 shows a holder adapted to be employed in conjunction with the tool of my invention;

Fig. 8 shows such holder with such tool secured therein;

Fig. 9 is an end view of the tool and holder combination of Fig. 8;

Fig. 10 shows a helically formed tool of the twisted stem type made in accordance with my invention;

Figure 11:
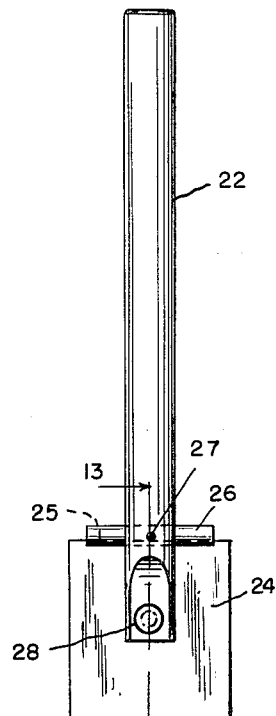
Fig. 11 is an elevational view of another form of my new abrading tool.
Figure 12:
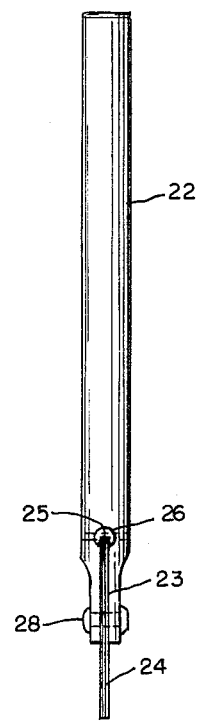
Fig. 12 is a side elevational view of the tool of Fig. 11 viewed at right angles with such tool rotated 90° about the axis of its stem.

Referring now more particularly to said drawing and especially Figs. 1-3 thereof, I may employ a rectangular section of sheet material such as felt 1, having appreciable thickness, as the operative or "brushing" element. As shown in Fig. 1, a wire 2 may be inserted through a hole 3 spaced from the edge of such felt element and then doubled and twisted upon itself to form a twisted stem 4. The layer of felt is thus firmly secured between the straight parallel retaining portions 5 of the wire stem member.

Ease of manufacture is greatly increased if a narrow slot 6 is provided extending from hole 3 to the lower edge 7 of the felt element extending in the direction opposite to stem 4. When assembling the tool, the wire member may then be passed laterally through such slot either prior to doubling of the wire or after such wire has preliminarily been formed into an open loop rather than requiring that the end of the wire be passed through the hole 3. The end portions of such open wire loop are then, of course, twisted together to form the stem 4 and to tightly secure the felt element between the parallel retaining portions 5.

As shown in Fig. 3, the sides and ends of the felt element may be trimmed or shaped to any desired contour to adapt the same to the shape of the particular opening to be operated upon. In this instance a stepped construction is shown with the portion 2 of the felt element adjacent the end of the latter having a lesser lateral dimension than the upper portion 3. It is, of course, apparent that such element may be trimmed to a tapered, semi-circular, or any other desired form as long as such element is symmetrical relative to its axis as defined by the wire stem retaining member.

Referring now to Figs. 4–6 inclusive, there is there illustrated another modified form of my new rotary tool which in this instance comprises a plurality of layers of woven wire cloth 10 bound together by means of a suitable plastic material such as rubber, neoprene (polychloroprene), melamine, or nylon (polyamide resins), for example. The wire stem member is inserted through the hole 11 as shown in Fig. 6 and twisted to form the stem 4 similarly to the Fig. 1 construction. Any of the powdered abrasives such as Carborundum or Alundum, for example, may be incorporated with the bonding material which is ordinarily an elastomer. For ease of assembly of the operating element the bonding material such as neoprene may be provided in sheet form and alternate layers of such sheet and the wire cloth may be stacked one upon the other, compressed under pressure, and the neoprene then cured. As in the case of the Fig. 3 construction, the finished element may likewise be cut to desired contour. It will of course be apparent that when the wire stem member is parallel to one set of strands composing the wire mesh there will be provided "brushing" strands operative to act upon both the sides and end of a blind passage. If desired, the several layers of wire cloth or screening may be superimposed and bonded together with the component strands of one layer lying at an angle to strands of other layers, and this may be desirable in certain instances as where the finished element is to have a tapered contour, for example.

Tools of the type above described may desirably be mounted in holders (Figs. 7–9) comprising a tubular portion 12 and a shank 13 adapted to be inserted in a drill press collet, for example. Bore 14 of tubular portion 12 is dimensioned to receive the twisted stem 4 of my new tool with the brushing element 15 held and supported in transverse slot 16 in the end of such tubular portion 12. The "brushing" element 15 corresponds to the element 1 of Fig. 1 or any of the various modifications thereof. A set screw 17 may be employed to secure stem 4 in place. It will thus be seen that means is provided for supporting the "brushing" element in a convenient manner permitting ready replacement of the latter when necessary, and without any danger of either the wire retaining member 5 or of tubular holder 12 contacting and damaging the work-piece.

In Fig. 10 there is illustrated another embodiment of my invention wherein a strip of felt 18, similar to element 1 of Fig. 1 but much more elongated, is clamped between retaining wire portions 19 doubled through hole 20, which latter wire portions are twisted after formation of twisted stem portion 4 to impart a helical configuration to such strip of felt as shown. The end 21 of the latter is, of course, adapted to act upon the end of a blind hole or passageway and further serves to prevent contact of the doubled retaining wire with the work.

While the felt or other operating element may ordinarily be sufficiently firmly secured between the wire portions 5 simply by twisting such portions together as explained, it is often desirable to forcibly press such wire portions together, as between dies, to compact and secure such element therebetween. Pressures on the order of 10,000 to 20,000 lbs. per square inch or more may sometimes be imposed although considerably lower pressures are sufficient where the operating element is of relatively compressible material. Where high pressures are employed, the wire will desirably have a flat face, as with half-round wire, which will be directed toward the element to obviate any danger of cutting the latter. A more rigid structure is likewise obtained and flexure is not concentrated along a single line in use.

When a tool of the Fig. 10 type is to be produced having a relatively long strip of material to be secured between retaining wire portions, it is particularly desirable that such portions be flat faced as above described and that the material be compacted therebetween by application of pressure. The stem portion 4 will then preferably be twisted prior to twisting of such retaining portions.

The operating or "brushing" element may comprise a wide variety of materials, as above indicated. Such materials should, however, be self-supporting (i. e. not limp) and will be selected for the particular use contemplated. Thus, layers of abrasive paper or abrasive cloth, or layers of each, may be bonded together, preferably by means of an elastomer, to form such element of my new article. The paper or cloth will desirably have abrasive adhered to both sides thereof before being assembled to form the element. Such element, while self-supporting, should not be entirely rigid but should be capable of flexing in use. The woven-wire cloth 10 will therefore preferably be of wire of the type used in power brushes having a certain resilience and snap action. Layers of cotton fabric buff material and similar fabrics may be stapled or riveted together rather than bonded if a softer buff-type element is desired and, in fact, in some cases the clamping action of the wire retaining member may be relied upon to secure a plurality of such layers of sheet material without any means being provided actually attaching the layers together.

The surface-finishing element will thus be seen to comprise a generally flat sheet of substantial thickness (so as to present an effective work-contacting surface) of flexible material, which for many purposes will also be resilient in character. Such element should of course be of a contour symmetrical relative to the wire stem member which defines the axis of rotation.

The wire stem member may be considered as passing through the body of the surface-finishing element whether it is forced through, inserted through a hole, or doubled through a notch therein. In any event, the point of doubling of such member is located inwardly from the end of the element and therefore cannot contact the work. Such doubled portions may be secured together beyond the body of the surface-finishing element by other means than by twisting together, as by soldering, clipping or wrapping, or insertion in a suitable holder. Twisting is ordinarily a suitable method, however, being quick and inexpensive, and, even when pressures in excess of the tensile strength of the wire are required to be imposed to compact the body of the surface-finishing element between the doubled portions of the wire, when such element has been thus compacted the wire will be found sufficiently strong to retain the material in compacted state. Instead of steel or other metal wire, it will be apparent that equivalent elongated stem members of suitable synthetic plastic materials may be employed. Wire stem members will, however, ordinarily be employed, and the resultant stems may desirably be ground or otherwise finished to provide a substantially true and cylindrical stem suitable for mounting in a drill press or other high speed rotary machine tool.

While, in the Fig. 10 embodiment, an elongated rectangular sheet or strip 18 is shown with the wire 19 passed therethrough at a point on the longitudinal axis adjacent one end thereof, it will be understood that such end may instead be slitted or notched to receive the doubled wire. Also, the strip or sheet of surface-finished material may, for example, be of greater width adjacent the twisted stem 4 and taper toward the end, depending on the particular operation for which the tool is designed.

The term "surface-finishing" as employed herein is intended to include cleaning, polishing and like operations.

Referring now more particularly to Figs. 11–14 of the drawing, another embodiment of my invention is there illustrated which may comprise a steel rod 22 adapted to serve as a stem member and slotted at 23 in its lower end portion to receive a plurality of thin rectangular metal sheets 24 which may desirably be of a very hard metal such as Hadfield steel. The upper edges of such sheets are received within a groove 25 in a transverse bar 26 secured in place in holder 22 by a rivet 27. The sheets 24 are secured in slot 23 by means of a rivet 28.

The transverse reinforcing member 26 serves to brace the upper edges of sheets 24 which are received therein and also prevents any slight tendency of such sheets to turn about the axis of rivet 28. Member 26 ordinarily will not extend the entire width of sheets 24 so that it will not engage the inner surface of a hole in the work in which the tool may be inserted.

Figure 14:
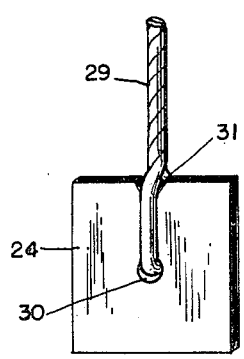
Fig. 14 is a detail view of a novel abrading element of the type comprising a component of the Fig. 11 tool but adapted to be mounted and secured in a chuck or in a holder such as that shown in Fig. 7, for example.
Figure 13:
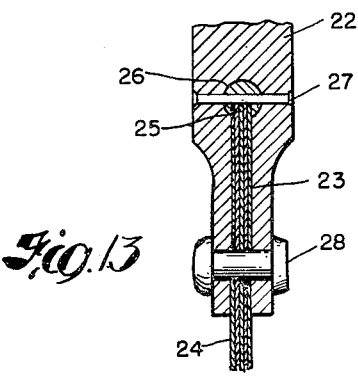
Fig. 13 is a fragmentary vertical sectional view on an enlarged scale taken along the line 13—13 on Fig. 11.

As shown in Fig. 14, one or more of such metal sheets 24 may be assembled in side-by-side relationship and secured together as a unit by means of twisted wire stem member 29 passing through hole 30 in such sheet assembly. The upper edge of the sheet assembly may also be slightly notched at 31, if desired, for more rigid securing of the sheets by the twisted wire stem. This assembly is, of course, adapted to be inserted in holder 12 in the manner illustrated in Figs. 7–9 inclusive.

If desired, the metal sheets 24 may be plastic coated, individually or as a unit, to protect the same against corrosion as well as against the destructive effects of vibration, for such plastic coating can serve as a damper; and layers of fabric, screening, felt, and other sheet materials as described above may be interposed between or assembled with the layers of metal sheets 24. Such metal sheets, particularly when of hard, wear resistant metal such as Hadfield steel, which nevertheless are tough and not easily broken, are capable of affording a scraping action in use which is very effective in certain types of work when rotated at high speeds about the axis of its stem.

Hadfield steel is an austinitic steel containing approximately 14% manganese and is commercially available in thin sheets of from about .005 to .020 inch in thickness. Other hard sheet materials, including thin spring steel and other spring metal stocks may be employed in accordance with my invention. Woven glass fiber sheets are useful especially when impregnated with or reinforced with layers of synthetic plastic such as nylon, for example. In general, hard abrasive materials will be utilized, either forming the sheet material itself or being adhered thereto or incorporated therein in the form of abrasive grains.

Other modes of applying the principle of the invention may be employed, change being made as regards the details described, provided the features stated in any of the following claims or the equivalent of such be employed.

I therefore particularly point out and distinctly claim as my invention:

1. A rotary surface-finishing tool adapted to be rotated at high speeds about its axis simultaneously to act upon both laterally and axially disposed work surfaces, as within a blind hole in a work-piece, comprising a plurality of superimposed sheets of Hadfield steel of like dimensions, and a wire stem member formed into a loop passing through said sheets at a point spaced inwardly from the edges thereof and doubled upon itself to clamp said sheets between straight parallel wire portions tightly clamping said sheets therebetween, the wire portions extending beyond said sheets being secured together to form a stem and to hold said sheets thus tightly clamped.

2. A rotary surface-finishing tool adapted to be rotated at high speeds about its axis simultaneously to act upon both laterally and axially disposed work surfaces, as within a blind hole in a work-piece, comprising a plurality of superimposed sheets of steel of like dimensions, and a wire stem member formed into a loop passing through said sheets at a point spaced inwardly from the edges thereof and doubled upon itself to clamp said sheets between straight parallel wire portions tightly clamping said sheets therebetween, the wire portions extending beyond said sheets being secured together to form a stem and to hold said sheets thus tightly clamped.

3. A rotary surface-finishing tool adapted to be rotated at high speeds about its axis simultaneously to act upon both laterally and axially disposed work surfaces, as within a blind hole in a work-piece, comprising a plurality of superimposed sheets of metal of like dimensions, and a wire stem member formed into a loop passing through said sheets at a point spaced inwardly from the edges thereof and doubled upon itself to clamp said sheets between straight parallel wire portions tightly clamping said sheets therebetween, the wire portions extending beyond said sheets being secured together to form a stem and to hold said sheets thus tightly clamped.

4. A rotary tool comprising a plurality of superimposed thin sheets of Hadfield steel and a stem member symmetrically secured thereto and extending therefrom in the general plane of said sheets, the end portion of said stem member secured to said sheets terminating at a point spaced inwardly from the edges of said sheets to permit said tool to act upon both laterally and axially disposed work surfaces.

5. A rotary tool comprising a plurality of superimposed thin sheets of steel and a stem member symmetrically secured thereto and extending therefrom in the general plane of said sheets, the end portion of said stem member secured to said sheets terminating at a point spaced inwardly from the edges of said sheets to permit said tool to act upon both laterally and axially disposed work surfaces.

6. A rotary surface-finishing tool adapted to be rotated at high speeds about its axis simultaneously to act upon both laterally and axially disposed work surfaces, as within a blind hole in a work-piece, comprising a generally flat body of Hadfield steel sheet material, an elongated holder member having a longitudinally slotted end with said body of sheet material symmetrically received in such slot and projecting therefrom both laterally and axially of said holder member, means adapted to secure said sheet material thus positioned in such slot, and transverse laterally projecting brace means on said holder member in engagement with the inner edge of said sheet material received in such slot to support such material in use.

7. A rotary surface-finishing tool adapted to be rotated at high speeds about its axis simultaneously to act upon both laterally and axially disposed work surfaces, as within a blind hole in a work-piece, comprising a generally flat body of metal sheet material, an elongated holder member having a longitudinally slotted end with said body of sheet material symmetrically received in such slot and projecting therefrom both laterally and axially of said holder member, means adapted to secure said sheet material thus positioned in such slot, and transverse laterally projecting brace means on said holder member in engagement with the inner edge of said sheet material received in such slot to support such material in use.

References Cited in the file of this patent
UNITED STATES PATENTS

| Number | Name | Date |
|---|---|---|
| 437,463 | Teague | Sept. 23, 1890 |
| 1,361,861 | Howell | Dec. 14, 1920 |
| 1,389,071 | Pessels | Aug. 30, 1921 |
| 2,370,490 | Rice | Feb. 27, 1945 |
| 2,370,491 | Rice | Feb. 27, 1945 |
| 2,522,613 | Harrison et al. | Sept. 19, 1950 |
| 2,603,921 | Peterson | July 22, 1952 |